(12) United States Patent
Sornborger (10) Patent No.: US 9,014,501 B2
(45) Date of Patent: Apr. 21, 2015

(54) METHODS AND SYSTEMS FOR ENHANCING DATA

(71) Applicant: University of Georgia Research Foundation, Inc., Athens, GA (US)

(72) Inventor: Andrew T. Sornborger, Davis, CA (US)

(73) Assignee: University of Georgia Research Foundation, Inc., Athens, GA (US)

( * ) Notice: Subject to any disclaimer, the term of this patent is extended or adjusted under 35 U.S.C. 154(b) by 141 days.

(21) Appl. No.: 13/774,406

(22) Filed: Feb. 22, 2013

(65) Prior Publication Data

US 2013/0223753 A1 Aug. 29, 2013

Related U.S. Application Data

(60) Provisional application No. 61/602,559, filed on Feb. 23, 2012.

(51) Int. Cl.
G06K 9/40 (2006.01)
G06K 9/00 (2006.01)
G06K 9/52 (2006.01)

(52) U.S. Cl.
CPC .............. *G06K 9/52* (2013.01); *G06K 9/00496* (2013.01)

(58) Field of Classification Search
CPC ............ G06K 9/0014; G06K 9/00496; G06K 9/0523; G06K 9/52
USPC .......... 382/128–134, 254, 278, 280, 305, 312
See application file for complete search history.

(56) References Cited

U.S. PATENT DOCUMENTS

| 8,265,360 | B2 * | 9/2012 | Sornborger et al. | 382/128 |
| 8,571,277 | B2 * | 10/2013 | Suri et al. | 382/128 |
| 8,818,064 | B2 * | 8/2014 | Walker et al. | 382/131 |

OTHER PUBLICATIONS

Anderson, T. (1984) An Introduction to Multivariate Statistical Analysis. John Wiley and Sons, New York. Title Page, Copyright Page, Table of Contents. 9 pages.
Brillinger, D. "Time Series Data Analysis and Theory". San Francisco: Holt, Rinehart and Winston, Inc., 1975. Title Page, Copyright Page and Table of Contents. 6 pages total.
Fisher, R. (1929) "Tests of significance in harmonic analysis". 1929. Proceedings of the Royal Society of London. Series A. , 125:54-59.
Giri, N. "On the complex analogues of $T^2$- and $R^2$- tests". 1965. *The Annals of Mathematical Statistics*. vol. 36(2):664-670.
Goodman, N. "Statistical analysis based on a certain multivariate complex gaussian distribution (an introduction)". 1963. *Ann Math Statist* 34:152-177.
Hannan, E. "Multichannel Time Series". 1970. Wiley and Sons, Inc., New York. Title Page, Copyright Page, Table of Contents. 5 pages.
Hotelling, H. "Relations Between Two Sets of Variates". 1936. Biometrika 28(3/4):321-377.

(Continued)

*Primary Examiner* — Kanjibhai Patel
(74) *Attorney, Agent, or Firm* — Mueting Raasch & Gebhardt, P.A.

(57) ABSTRACT

Methods and systems for data analysis using covarying data. Eigenvalues and eigenvectors of one or more lagged covariance matrices of data obtained over time may be generated and used to enhance the data.

42 Claims, 4 Drawing Sheets

(56) References Cited

OTHER PUBLICATIONS

Kalatsky, et al. "New paradigm for optical imaging: temporally encoded maps of intrinsic signals". 2003. *Neuron*, 38:529-545.

Kettenring. "Canonical analysis of several sets of variables". 1971. *Biometrika* 58(3):433-451.

Mitra, et al. "Analysis of dynamic brain imaging data". 1999. *Biophys J* 76(2): 691-708.

National Institutes of Health Grant No. NS070159. "Dore: Developmental Neurophysiology". 15 pages, Dec. 5, 2008.

National Institutes of Health Grant No. MH085973. "Online Multivariate Statistical Neural Imaging Data Analysis". 52 pages, Nov. 12, 20009.

Percival et al. "Spectral Analysis for Physical Applications". Cambridge University Press. 1993. Title Page, Copyright Page, Table of Contents. 5 pages total.

Pesaran, et al. Spectral analysis for dynamical imaging data. Cold Spring Harbor Laboratory Press, NY. 14 pages, 2005.

Quinn et al. "The Estimation and Tracking of Frequency". 2001. Cambridge University Press, Cambridge, UK. Title Page, Copyright Page, Table of Contents. 4 pages.

Slepian, D. "Prolate Spheroidal Wave Functions, Fourier Analysis and Uncertainty—IV: Extensions to Many Dimensions; Generalized Prolage Spheroidal Functions" 1964. *Bell System Tech J* 43(6):3009-3057.

Sornborger et al. "A multivariate, multitaper approach to detecting and estimating harmonic response in cortical optical imaging data". 2011. *J Neurosci Meth* 203(1):254-263.

Sornborger et al. "Spatio-temporal analysis of optical imaging data". 2003. *NeuroImage* 18:610-621.

Sornborger et al. "Extraction of average and differential dynamical responses in stimulus-locked experimental data". 2005. *J Neurosci Meth*. 141:223-229.

Thomson. "Spectrum estimation and harmonic analysis". 1982. *Proceedings of the IEEE*. 70(9):1055-1096.

Walden. "A unified view of multitaper multivariate spectral estimation". 2000. *Biometrika*. 87(4):767-787.

Yokoo et al. "An optimization approach to signal extraction from noisy multivariate data". 2001. *NeuroImage* 14(6): 1309-26.

\* cited by examiner

METHODS AND SYSTEMS FOR ENHANCING DATA

CROSS-REFERENCE TO RELATED APPLICATIONS

This application claims the benefit of U.S. Provisional Application Ser. No. 61/602,559 filed 23 Feb. 2012, entitled "Methods for Enhancing Data," which is incorporated herein by reference in its entirety.

STATEMENT OF GOVERNMENT RIGHTS

This invention was made with government support under a grant from the National Institutes of Health (Grant Nos. NS070159 and MH085973). The government has certain rights in this invention.

BACKGROUND

The present disclosure relates generally to the processing of data. More specifically, the present disclosure pertains to the use, or utilization of the properties of lagged covarying data and the decomposition thereof for use in generating enhanced data.

SUMMARY

The present disclosure relates generally to the processing of data (e.g., methods, systems, programs for systems, etc.). Such data may include, e.g., neural image data, multiple electrode data, magnetic resonance imaging data, image data, signal data, measurement data, stock data, weather data, antenna array data, satellite imaging data, video data, sensor array data, industrial process data, geophysical data, astronomical data, etc.

One exemplary computer-implemented method for use in analysis of data may include providing a dataset representative of data obtained over time (e.g., plurality of frames of image data obtained over time), generating a plurality of eigenvalues and a plurality of eigenvectors of at least one lagged covariance matrix (e.g., a plurality of lagged covariance matrices for the dataset) for the dataset in the time domain, and reconstructing an enhanced dataset using the plurality of eigenvalues and eigenvectors and the dataset.

One exemplary computer program for use in conjunction with a processing apparatus to analyze data is stored on a non-transitory computer readable storage medium and is operable when used with the processing apparatus to recognize a dataset representative of data obtained over time (e.g., plurality of frames of image data obtained over time), generate a plurality of eigenvalues and a plurality of eigenvectors of at least one lagged covariance matrix (e.g., a plurality of lagged covariance matrices for the dataset) for the dataset in the time domain, and reconstruct an enhanced dataset using the plurality of eigenvalues and eigenvectors and the dataset.

In one or more embodiments, generating the plurality of eigenvalues and the plurality of eigenvectors of at least one lagged covariance matrix for the dataset in the time domain may include generating at least one shift matrix for the dataset in the time domain (e.g., using fast Fourier transforms) and generating the plurality of eigenvalues and the plurality of eigenvectors based on the at least one shift matrix. In at least one embodiment, generating the plurality of eigenvalues and the plurality of eigenvectors of at least one shift matrix for the dataset in the time domain may include generating a zero-shifted matrix for the dataset in the time domain and generating the plurality of eigenvalues and the plurality of eigenvectors based on the at least one shift matrix and the zero-shifted covariance matrix. In at least one embodiment, generating the plurality of eigenvalues and the plurality of eigenvectors of at least one shift matrix for the dataset in the time domain may include generating a mean estimate dataset for use in generating the at least one shift matrix, removing the mean estimate dataset from the dataset to generate a residual dataset, and generating the at least one shift matrix for the residual dataset.

In one or more embodiments, generating the plurality of eigenvalues and the plurality of eigenvectors of at least one lagged covariance matrix for the dataset in the time domain may include generating at least one lagged covariance matrix for the dataset in the time domain and generating the plurality of eigenvalues and the plurality of eigenvectors based on the at least one lagged covariance matrix. In at least one embodiment, generating the plurality of eigenvalues and the plurality of eigenvectors of at least one lagged covariance matrix for the dataset in the time domain may further include generating a zero-lagged covariance matrix for the dataset in the time domain and generating the plurality of eigenvalues and the plurality of eigenvectors based on the at least one lagged covariance matrix and the zero-lagged covariance matrix. In at least one embodiment, generating the at least one lagged covariance matrix for the dataset in the time domain may include generating a mean estimate dataset for use in generating the at least one lagged covariance matrix, removing the mean estimate dataset from the dataset to generate a residual dataset, and generating the at least one lagged covariance matrix for the residual dataset.

In one or more embodiments, the exemplary methods may further include and the exemplary programs may be operable to execute testing the plurality of eigenvalues and the plurality of eigenvectors for significance and selecting a set of the plurality of eigenvalues and the plurality of eigenvectors based on the tested significance for use in reconstructing the enhanced dataset. In at least one embodiment, testing the plurality of eigenvalues and the plurality of eigenvectors for significance may include using bootstrap estimates to determine the significance of the plurality of eigenvalues and the plurality of eigenvectors. The bootstrap estimates may be generated using multitaper techniques. In at least one embodiment, testing the plurality of eigenvalues and the plurality of eigenvectors for significance may include using at least one of machine learning techniques, canonical variate analysis, support vector machines, and generalized indicator function analysis.

In one or more embodiments, reconstructing an enhanced dataset may include generating a set of transformation vectors using the plurality of eigenvalues and eigenvectors, generating a set of orthogonal basis transformation vectors based on the set of transformation vectors defining a subspace, projecting the dataset onto the subspace defined by the set of orthogonal basis vectors resulting in projected data, and using the projected data to generate the enhanced dataset.

In one or more embodiments, the exemplary methods may further include and the exemplary programs may be operable to execute outputting the enhanced dataset to at least one of a user, a display, a file, etc.

One exemplary computer-implemented method for use in analysis of data may include providing a dataset representative of data obtained over time (e.g., plurality of frames of image data obtained over time), generating a plurality of eigenvalues and a plurality of eigenvectors of a plurality of lagged covariance matrices for the dataset, and reconstructing an enhanced dataset using the plurality of eigenvalues and eigenvectors and the dataset.

One exemplary computer program for use in conjunction with a processing apparatus to analyze data that is stored on a non-transitory computer readable storage medium and is operable when used with the processing apparatus to recognize a dataset representative of data obtained over time (e.g., plurality of frames of image data obtained over time), generate a plurality of eigenvalues and a plurality of eigenvectors of a plurality of lagged covariance matrices for the dataset, and reconstruct an enhanced dataset using the plurality of eigenvalues and eigenvectors and the dataset.

In one or more embodiments, generating the plurality of eigenvalues and the plurality of eigenvectors of a plurality of lagged covariance matrices for the dataset may include generating a plurality of shift matrices for the dataset and generating the plurality of eigenvalues and the plurality of eigenvectors based on the plurality of shift matrices. In at least one embodiment, generating the plurality of eigenvalues and the plurality of eigenvectors based on the plurality of shift matrices may include generating the plurality of eigenvalues and the plurality of eigenvectors based on the plurality of shift matrices using fast Fourier transforms.

In one or more embodiments, generating the plurality of eigenvalues and the plurality of eigenvectors of a plurality of lagged covariance matrices for the dataset may include generating a plurality of lagged covariance matrices for the dataset and generating the plurality of eigenvalues and the plurality of eigenvectors based on the plurality of lagged covariance matrices. In at least one embodiment, generating the plurality of eigenvalues and the plurality of eigenvectors of a plurality of lagged covariance matrices for the dataset further may include generating a zero-lagged covariance matrix for the dataset and generating the plurality of eigenvalues and the plurality of eigenvectors based on the plurality of lagged covariance matrices and the zero-lagged covariance matrix. In at least one embodiment, generating the plurality of eigenvalues and the plurality of eigenvectors based on the plurality of lagged covariance matrices may include summing the plurality of lagged covariance matrices to generate a summed covariance matrix and generating the plurality of eigenvalues and the plurality of eigenvectors based on the summed covariance matrix.

In one or more embodiments, the exemplary methods may include and the exemplary programs may be further operable to execute testing the plurality of eigenvalues and the plurality of eigenvectors for significance and selecting a set of the plurality of eigenvalues and the plurality of eigenvectors based on the tested significance for use in reconstructing the enhanced dataset. In at least one embodiment, testing the plurality of eigenvalues and the plurality of eigenvectors for significance may include using bootstrap estimates to determine the significance of the plurality of eigenvalues and the plurality of eigenvectors. The bootstrap estimates may be generated using multitaper techniques.

In one or more exemplary methods and programs, the exemplary methods and programs may include testing the plurality of eigenvalues and the plurality of eigenvectors for significance (e.g., using jacicknife estimates, using at least one of canonical variate analysis, support vector machines, generalized indicator function analysis, using any other machine learning methods, etc.) and selecting a set of the plurality of eigenvalues and the plurality of eigenvectors based on the tested significance for use in reconstructing the enhanced dataset.

In one or more exemplary methods and programs, reconstructing an enhanced dataset may include generating a set of transformation vectors using the plurality of eigenvalues and eigenvectors, generating a set of orthogonal basis transformation vectors based on the set of transformation vectors defining a subspace, projecting the dataset onto the subspace defined by the set of orthogonal basis vectors resulting in projected data, and using the projected data to generate the enhanced dataset.

In one or more exemplary methods and programs, the exemplary methods and programs may include outputting the enhanced dataset to at least one of a user, a display, and a file.

The above summary is not intended to describe each embodiment or every implementation of the present disclosure. Advantages, together with a more complete understanding of the invention, will become apparent and appreciated by referring to the following detailed description and claims taken in conjunction with the accompanying drawings.

DETAILED DESCRIPTION OF EXEMPLARY EMBODIMENTS

In the following description of the embodiments, reference is made to drawings which form a part hereof, and in which are shown by way of illustration specific embodiments that may be practiced. It is to be understood that other embodiments may be utilized and processing step/structural changes may be made without departing from the scope of the present disclosure.

Figure 1:
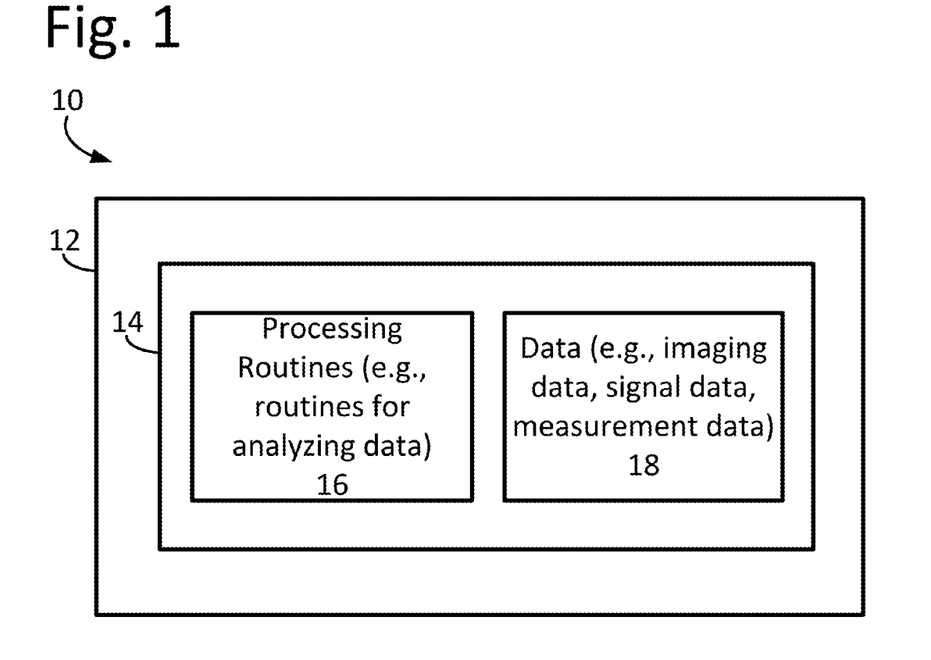
FIG. 1 shows a general block diagram of a general illustrative data processing system for use in analysis of data according to the present disclosure.

FIG. 1 shows a system 10 including processing apparatus (block 12) and data storage (block 14). Data storage (block 14) allows for access to processing programs or routines (block 16) and one or more other types of data (block 18) that may be employed to carry out the illustrative methods (e.g., two of which are shown generally in the block diagram of FIGS. 2-3).

For example, processing programs or routines (block 16) may include programs or routines for performing computational mathematics, matrix mathematics, decomposition algorithms, compression algorithms (e.g., data compression algorithms), calibration algorithms, image construction algorithms, signal processing algorithms (e.g., Fourier transforms, fast Fourier transforms, etc.), standardization algorithms, comparison algorithms, vector mathematics, or any other processing required to implement one or more embodiments as described herein. Data (block 18) may include, for example, sampled neural imaging data, measurement data, signal data, antenna array data, stock data, weather data, industrial process data, geophysical data, astronomical data, etc., results from one or more processing programs or routines employed according to the present disclosure, or any other data that may be necessary for carrying out the one or more processes described herein.

In one or more embodiments, the system 10 may be implemented using one or more computer programs executed on programmable computers, such as computers that include, for example, processing capabilities, data storage (e.g., volatile or non-volatile memory and/or storage elements), input devices, and output devices. Program code and/or logic described herein may be applied to input data to perform functionality described herein and to generate desired output information. The output information may be applied as input to one or more other devices and/or processes as described herein or as would be applied in a known fashion.

The program used to implement the processes described herein may be provided using any programmable language, e.g., a high level procedural and/or object orientated programming language that is suitable for communicating with a computer system. Any such programs may, for example, be stored on any suitable device, e.g., a storage media, readable by a general or special purpose program, computer or a processor apparatus for configuring and operating the computer when the suitable device is read for performing the procedures described herein. In other words, at least in one embodiment, the system 10 may be implemented using a non-transitory computer readable storage medium, configured with a computer program, where the non-transitory storage medium so configured causes the computer to operate in a specific and predefined manner to perform functions described herein.

Likewise, the system 10 may be configured at a remote site (e.g., an application server) that allows access by one or more users via a remote computer apparatus (e.g., via a web browser), and allows a user to employ the functionality according to the present disclosure (e.g., user accesses a graphical user interface associated with one or more programs to process data).

The processing apparatus (block 12), may be, for example, any fixed or mobile computer system (e.g., a personal computer or mini computer). The exact configuration of the computing apparatus is not limiting and essentially any device capable of providing suitable computing capabilities and control capabilities may be used. Further, various peripheral devices, such as a computer display, mouse, keyboard, memory, printer, scanner, are contemplated to be used in combination with processing apparatus (block 12) of the data storage (block 14).

Figure 2:
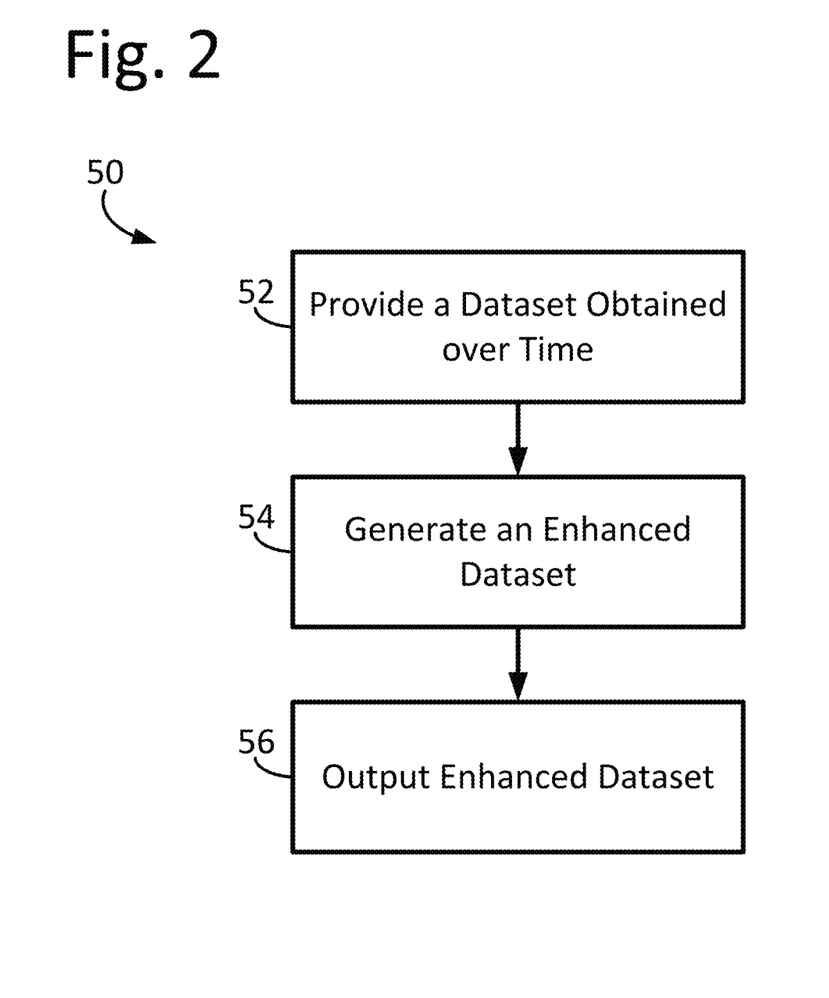
FIG. 2 shows a general block diagram of a general illustrative data processing method for analyzing data according to the present disclosure.

FIG. 2 shows a general block diagram of an illustrative method 50 for use in analysis of data. One will recognize that one or more of the blocks of functionality described herein may be carried out using one or more programs or routines, and/or any other components of an exemplary system.

Generally, the exemplary method 50 includes providing a dataset obtained over time 52, generating an enhanced dataset 54, and outputting the enhanced dataset 56. The dataset obtained over time may be image data such as, e.g., a plurality of frames of image data (or image frames) obtained over time. For example, the image data can be considered to be a video. Further, the dataset may be any kind of data that may be effectively analyzed using the exemplary methods and programs described herein.

Figure 3:
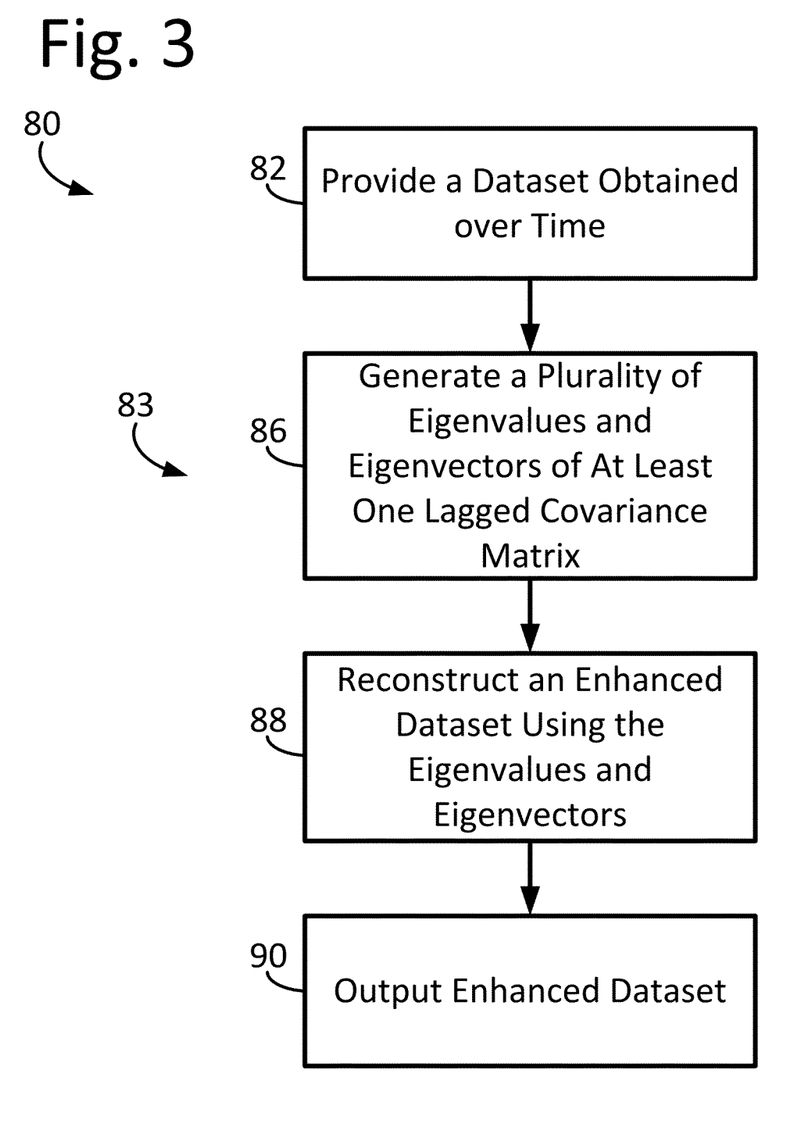
FIG. 3 shows a more detailed block diagram of one illustrative embodiment of a method for analyzing ratiometric data as generally illustrated in the method of FIG. 2.

FIG. 3 shows a block diagram of an illustrative method 80 for use in analysis of data. The exemplary method 80 includes providing a dataset obtained over time 82 and generating an enhanced data set 83. The dataset obtained over time may represent any data that may be effectively analyzed by the exemplary methods and programs described herein, such as, e.g., neural image data, signal data, measurement data, multiple electrode data, stock data, antenna array data, etc. In at least one embodiment, the data obtained over time is a plurality of frames of image data obtained over time (e.g., video data, each frame be an image at a particular point in time over a period of time, etc.).

To generate an enhanced dataset 83, the method 80 may include utilize, or use, the properties of lagged covarying data within the dataset obtained over time, e.g., in the form of one or more shift matrices, one or more lagged covariance matrices, etc. In other words, the method 80 may use matrices that relate to the lagged covarying data such as shift matrices or may use the lagged covariance matrices themselves to generate an enhanced dataset 83.

For example, the method 80 may include generating a plurality of eigenvalues and eigenvectors of at least one lagged covariance matrix for the dataset 86 (e.g., as described in the exemplary framework provided herein with respect to Equation 9). The eigenvalues and eigenvectors of at least one lagged covariance matrix for the dataset may be computed, or calculated, using one or more processes. In at least one embodiment, one or more shift matrices (e.g., one shift matrix, more than one shift matrix, a plurality of shift matrices, etc.) may be generated and the eigenvalues and eigenvectors may be generated based on the one or more shift matrices (e.g., as described in the exemplary framework provided herein with respect to Equations 30-33). The shift matrices are related to the lagged covariance matrices of the dataset. For example, the shift matrices may relate to lagged covariance matrices by matrix multiplication, whereby a lagged covariance matrix is formed by matrix multiplying a dataset by a shifted version of itself, where the shifted version of itself is formed by matrix multiplying the original dataset by a shift matrix The use of shift matrices may be advantageous because the eigenvalues and eigenvectors may be generated based on the shift matrices using fast Fourier transforms (e.g., as described in the exemplary framework provided herein with respect to Equations 34-35).

In at least one embodiment, one or more lagged covariance matrices (e.g., one lagged covariance matrix, more than one lagged covariance matrix, a zero-lagged covariance matrix and at least one lagged co-variance matrix, a plurality of lagged covariance matrices, etc.) may be generated and the eigenvalues and eigenvectors may be generated based on the one or more lagged covariance matrices (e.g., as described in the exemplary framework provided herein with respect to Equations 4 and 10). In at least one embodiment, multiple lagged covariance matrices may be summed and the plurality of eigenvalues and a plurality of eigenvectors may be generated based on the summed covariance matrix (e.g., e.g., as described in the exemplary framework provided herein with respect to Equation 10). Further, in at least one embodiment, a zero-lagged covariance matrix and at least one lagged covariance matrix may be generated for the dataset and used to generate the plurality of eigenvalues and eigenvectors. As used herein, a zero-lagged covariance matrix may be defined as a covariance matrix that whose entries, or values, represent the instantaneous covariance between variables (e.g., the covariance between variables occurring at the same time, or in the same time frame).

The lagged covariance matrices, the shift matrices (e.g., corresponding to the lagged covariance matrices), and/or the eigenvalues and eigenvectors may be generated in the time domain (as opposed to the frequency domain). The generation of the lagged covariance matrices, the shift matrices, and eigenvalues and eigenvectors in the time domain may provide increased statistical power relative to the frequency domain. Further, in at least one embodiment, the dataset may not be moved into the frequency domain before generation of the lagged covariance matrices, the shift matrices, and eigenvalues and eigenvectors based on one of the lagged covariance matrices and the shift matrices.

Further, a mean estimate dataset for use in generating at least one lagged covariance matrix may be generated (e.g., as described in the exemplary framework provided herein with respect to Equations 14-15). For example, the mean estimate dataset may be removed from the dataset (e.g., the original dataset) to generate a residual dataset and the at least one lagged covariance matrix may be generated for, or based upon, the residual dataset (e.g., as described in the exemplary framework provided herein with respect to Equation 16).

To further generate an enhanced dataset 83, an enhanced dataset may be reconstructed using the eigenvalues and eigenvectors 88 (e.g., as described in the exemplary framework provided herein with respect to Equation 12). In at least one embodiment, the plurality of eigenvalues and the plurality of eigenvectors may be tested for significance (e.g., using jackknife estimates, using at least one of canonical variate analysis, support vector machines, and generalized indicator function analysis, etc.) and a set of the plurality of eigenvalues and the plurality of eigenvectors may be selected based on the tested significance for use in reconstructing the enhanced dataset (e.g., as described in the exemplary framework provided herein with respect to Equations 18-22). In at least one embodiment, testing the plurality of eigenvalues and eigenvectors for significance may occur in the frequency domain, and after the set of eigenvalues and eigenvectors are selected based on significance, the set may be transformed, or moved, back into the time domain before reconstruction of an enhanced dataset based on the selected set of eigenvalues and eigenvectors. In other words, the plurality of eigenvalues and eigenvectors used in one or more exemplary embodiments described herein may be analyzed in the frequency domain only when the eigenvalues and eigenvectors are tested for significance. Further, in at least one embodiment, the remainder of the steps, or processes, may all occur in the time domain.

Generally, to reconstruct an enhanced dataset, a set of transformation vectors may be generated using the plurality of eigenvalues and eigenvectors (e.g., selected set of eigenvalues and eigenvectors, etc.) and a set of orthogonal basis transformation vectors may be generated based on the set of transformation vectors defining a subspace. Further, the dataset may be projected onto the subspace defined by the set of orthogonal basis vectors resulting in projected data and the projected data may be used to generate the enhanced dataset.

After reconstructing the enhanced data set 88, the method 80 may further include outputting the enhanced dataset 90. In one or more embodiments, the output (e.g., an image, image data, an image data file, video file, plurality of images frames, a digital file, a file in user-readable format, etc.) may be analyzed by a user, used by another machine that provides output based thereon, etc.

As described herein, a digital file may be any non-transitory medium (e.g., volatile or non-volatile memory, a CD-ROM, a punch card, magnetic recordable tape, etc.) containing digital bits (e.g., encoded in binary, trinary, etc.) that may be readable and/or writeable by processing apparatus (block 14) described herein.

Also, as described herein, a file in user-readable format may be any representation of data (e.g., ASCII text, binary numbers, hexadecimal numbers, decimal numbers, audio, graphical) presentable on any medium (e.g., paper, a display, sound waves, etc.) readable and/or understandable by a user.

Generally, the methods and systems as described herein may utilize algorithms implementing computational mathematics (e.g., matrix inversions, substitutions, Fourier transform techniques, etc.) to reconstruct enhanced data described herein.

In view of the above, it will be readily apparent that the functionality as described in one or more embodiments according to the present disclosure may be implemented in any manner as would be known to one skilled in the art. As such, the computer language, the computer system, or any other software/hardware which is to be used to implement the processes described herein shall not be limiting on the scope of the systems, processes or programs (e.g., the functionality provided by such systems, processes or programs) described herein.

One will recognize that a graphical user interface may be used in conjunction with the embodiments described herein. The user interface may provide various features allowing for user input thereto, change of input, importation or exportation of files, or any other features that may be generally suitable for use with the processes described herein. For example, the user interface may allow default values to be used or may require entry of certain values, limits, threshold values, or other pertinent information.

More specific description regarding the algorithms used by the exemplary methods and systems described herein will be described within an exemplary framework for the detection and estimation of casual information in multivariate data (e.g., such as neural image data, etc.).

Exemplary Framework

When the spectrum of multiple neural processes contains coherent mean activity, for instance calcium release, in addition to stochastic background components, such as action potentials, the interpretation of cross-spectral estimates may become more difficult, particularly if the power in the mean activity at a given frequency is commensurate with that in the background spectrum. These difficulties may arise because the two components may have independent physical origins, and thus, cases may occur where both the background noise process and the mean component are independently coherent, but, because their cross-spectra have different phases, their sum appears incoherent.

To approach this problem, a framework may be constructed for the detection and estimation of statistically significant causal information in multivariate neural data, such as might be measured in calcium imaging or multiple electrode data. First, the contributions of the mean and covariance in the data may be separated. Second, the identification of causal information within these contributions may be optimized using a matrix decomposition. The separation of mean and covariance in the data may allow contributions to the signal from mean dynamics such as calcium release due to sustained firing rates or the response to a stimulus to be distinguished from stochastic covariance in the data such as transient calcium spikes or action potentials. The introduction of causal information as a key ingredient in the determination of neural-activity-relevant spatial information in the dataset may be useful to revealing the full structure of neuronal activity latent in the data.

In this exemplary framework, imaging data (e.g., neural imaging data) of interest may be represented, at least approximately or over a given time window, as a band-limited, weakly stationary process in Equation 1:

$$X(t) = \int_{-f_N}^{f_N} dZ(f) e^{2\pi i f t}. \tag{1}$$

Here, $dZ(f)$ represents a vector of length P of orthogonal increment Cramér process (see, e.g., D. Brillinger, Time Series Data Analysis and Theory. San Francisco: Holden-Day, 1974. A. Walden, "A unified view of multitaper multivariate spectral estimation," Biometrika, vol. 87, pp. 767-787, 2000; and D. Percival and A. Walden, Spectral Analysis for Physical Applications. Cambridge University Press, 1993) for which $$E\{dZ(f)\} = \mu(f)df \qquad (2)$$

and $$E\{(dZ(f)-\mu(f)df)(dZ(f')-\mu(f')df')^\dagger\} = \begin{cases} S_\Sigma(f)df, & f=f' \\ 0, & f \neq f'. \end{cases} \qquad (3)$$

It will also be assumed that $\mu(f)$ and $S_\Sigma(f)$ are independent. With these assumptions, the covariance at lag $\tau$ may be written as follows:

$$C(\tau) = \int dt X(t-\tau)X^T(t) \qquad (4)$$

$$= \int dt \int_{-f_N}^{f_N} dZ(f) \int_{-f_N}^{f_N} dZ^\dagger(f') e^{2\pi i(f-f')t} e^{2\pi i f\tau}, \qquad (5)$$

giving $$E\{C(\tau)\} = \int_{-f_N}^{f_N} df(S_\mu(f)+S_\Sigma(f))e^{2\pi i f\tau}, \qquad (6)$$

where $S_\mu(f)=E\{\mu\mu^\dagger\}$. As described, bolded letters may indicate vectors; capital, unbolded letters may indicate matrices; small, unbolded letters may indicate scalars; T may indicate the matrix transpose and † may indicate the Hermitian transpose (e.g., complex conjugated and transposed). With this representation of the data, it can be seen that the covariance matrix, $C(\tau)$, of the process may be separated into two contributions, $C_\mu(\tau)=\int df S_\mu e^{2\pi i f\tau}$ and $C_\Sigma(\tau)=\int df S_\Sigma e^{2\pi i f\tau}$, one representing the mean dynamics and the other representing the covariance of the random-phase background stochastic process.

Singular value decomposition (SVD) may be used to decompose a data matrix. Further, SVD may be used to estimate the principal components of stochastic processes and may also be useful in the study of system dynamics. The SVD is a matrix decomposition of the form $$X \equiv X(t) = \sum_n \phi_n \sigma_n a_n(t), \qquad (7)$$

where $$C(0)\phi_n = \lambda_n \phi_n, \qquad (8)$$

where the $\{\phi_n\}$ are orthogonal, the $\{\sigma_n=\sqrt{\lambda_n}\}$ are in descending order and $\{a_n(t)\}$ are the normalized projections, $\phi_n^T X(t)/\sigma_n$. From Equation 8, it may be seen that the left eigenvectors, $\{\phi_n\}$, of this decomposition represent covarying activity at zero-lag. However, successful models of neural activity, such as stochastic neuronal network models, auto-regressive, moving average (ARMA) processes, and their non-linear generalizations may demonstrate that neural activity may be causal, which may mean that although SVD may provide a complete basis for the data, SVD may fail to summarize important causal information when applied to neural data. Therefore, a decomposition based on the eigenvectors, $\{\psi_j\}$, of a matrix integral of the lagged covariance may be proposed as follows:

$$\Gamma\psi = \delta\psi, \qquad (9)$$

where $$\Gamma = \Gamma(\tau_c) = \int_{-\tau_c}^{\tau_c} d\tau C(\tau) \qquad (10)$$

and $\tau_c$ is a parameter denoting the maximum causal timescale of the process. The integrated covariance matrix, $\Gamma(\tau_c)$, is real and symmetric because $C(\tau)+C(-\tau)$ is a real, symmetric matrix, and thus, the eigenvectors of $\Gamma(\tau_c)$ are real and orthogonal. When $\tau_c=0$, its eigenvectors are the left eigenvectors, $\phi$, of the SVD.

Separating Equation 6 into its components and integrating $$\Gamma_{\mu,\Sigma}(\tau_c) = \int_{-f_N}^{f_N} df S_{\mu,\Sigma}(f)\sin(2\pi f\tau_c)/\pi f. \qquad (11)$$

The resulting mean ($\mu$) and stochastic ($\Sigma$) decompositions are then $$X^{\mu,\Sigma}(t) = \sum_n \psi_n^{\mu,\Sigma} \psi_n^{\mu,\Sigma T} X(t), \qquad (12)$$

where $\psi_n^\mu$ ($\psi_n^\Sigma$ resp.) are eigenvectors of $\Gamma_\mu$ ($\Gamma_\Sigma$ resp.).

To obtain estimates of $S_\mu$ and $S_\Sigma$, multitaper spectral analysis may be applied. Multitaper analysis may be based on the projection of a time series onto a set of m=1, ..., M orthogonal 'tapers' called Slepians. Slepians may serve as optimal band-pass filters provided M<2TW−3. Here, T is the number of points in the time series and W is a user-defined frequency bandwidth. After Fourier transforming the tapered data, the resulting function of frequency has low-bias (e.g., estimates of amplitudes at a given frequency are uninfluenced by frequencies outside of the bandwidth W). With a set of M tapered, Fourier-transformed frequency estimates, or so-called "eigenestimates," the data may then be averaged or regressed across the estimates, resulting in low-bias, smoothed spectral estimates with reduced variance due to the averaging. Multitaper analysis may allow one to perform statistics on a single dataset. Otherwise, the dataset would need to sub-divided to obtain separate samples or include multiple datasets.

The tapered eigenestimate may be defined in Equation 13:

$$J_m(f) \equiv \sum_{t=1}^T h_m(t)X(t)e^{-2\pi i f t}, \qquad (13)$$

where $h_m(t)$ is a Slepian. A least-squares, regression estimate of the mean $\mu(f)$ may be defined in Equation 14:

$$\hat{\mu}(f) = \sum_{m=1}^M J_m(f)H_m/\mathcal{H}, \qquad (14)$$

where $H_m = \Sigma_t h_m(t)$ and $\mathcal{H} = \Sigma_{l=1}^M H_l^2$. The covariance matrix of the mean estimate may be defined in Equation 15:

$$\hat{S}_\mu(f) = \mathcal{H}\hat{\mu}(f)\hat{\mu}^\dagger(f). \qquad (15)$$

A multitaper estimate of $S_\Sigma$ may be given by Equation 16:

$$\hat{S}_\Sigma(f) = \frac{1}{M-1}\sum_{m=1}^M (J_m(f)-\hat{\mu}(f)H_m)(J_m(f)-\hat{\mu}(f)H_m)^\dagger. \qquad (16)$$

With these estimates, estimates of the causal matrices, $\Gamma_\mu$ and $\Gamma_\Sigma$, may be formed as shown in Equation 17:

$$\hat{\Gamma}_{\mu,\Sigma} = \sum_{f=-f_N}^{f_N} \hat{S}_{\mu,\Sigma}(f) \sin 2\pi f \tau_c / \pi f. \quad (17)$$

Next, the eigenvalues and eigenvectors may be tested for statistical significance. The eigenvalues and eigenvectors may be tested for statistical significance using one or more different approaches such as, e.g., the distribution of the eigenvalues and eigenvectors obtained by an analysis (e.g., identical analysis) on a data matrix of normally distributed values whose power is equal to the data matrix being analyze or studied.

For example, the estimates $\hat{S}_\mu$ and $\hat{S}_\Sigma$ may be Wishart distributed with 2P and 2(M-P) degrees of freedom, respectively. The distributions of $\hat{\Gamma}_\mu$ and $\hat{\Gamma}_\Sigma$, however, may be more complicated, due to the summation over the function sin $(2\pi f \tau_c)/\pi f$ as shown in Equation 17.

Bootstrap estimates may be used to determine the significance of the eigenvalues and the eigenvectors. One exemplary bootstrap estimate is a jackknife estimate. Jackknife estimates may be used to determine mean and covariance estimates in such cases. For example, a jackknife estimate of the mean may be defined by:

$$\hat{\mu}^i(f) \equiv \sum_{(i)} J_m(f) H_m / \mathcal{H}, \quad (18)$$

where $\Sigma_{(i)}$ means the sum over all M tapers except the i'th taper. Similarly, $$\hat{S}_\Sigma^i(f) = \frac{1}{M-1} \sum_{(i)} (J_m(f) - \hat{\mu}(f) H_m)(J_m(f) - \hat{\mu}(f) H_m)^\dagger. \quad (19)$$

Propagating these estimates through the relations provided by Equations 15-17 may result in $\hat{\Gamma}_\mu^i$ and $\hat{\Gamma}_\Sigma^i$. Next, the jackknife mean and variance for the j'th ordered eigenvalue of one of the $\Gamma$'s may be determined. Thus, the following may be further defined:

$$\hat{\Gamma}^i \hat{\psi}_j^i = \delta_j^i \hat{\psi}_j^i, \quad (20)$$

where i denotes the i'th jackknife estimate and $\Gamma$ represents either $\Gamma_\mu$ or $\Gamma_\Sigma$. Pseudovalues for the eigenvalue estimates may then be defined as $\tilde{\delta}_j^i = M\hat{\delta}_j - (M-1)\hat{\delta}_j^i$, where $\hat{\delta}_j$ is the j'th eigenvalue of the full matrix $\hat{\Gamma}$ (e.g., with no tapers dropped). The jackknife mean may be defined as $\tilde{\delta}_j^J = 1/M \Sigma_{i=1}^M \tilde{\delta}_j^i$ and its variance is $\tilde{\sigma}_j^{2J} = 1/M(M-1) \Sigma_{i=1}^M (\tilde{\delta}_j^i - \tilde{\delta}_j^J)^2$.

Given the jackknife mean and variance estimates, the quantity $\tilde{\delta}_j^J / \tilde{\sigma}_j^J$ approximately follows a t-distribution with M-1 degrees of freedom for the null hypothesis that $\delta_j = 0$ and a standard t-test may be used to determine statistical significance of the eigenvalues.

A machine learning approached may be used to obtain estimates of the statistically significant subspace that contains the signal of interest, in this case the eigenvectors of either $\Gamma_\mu$ or $\Gamma_\Sigma$. For example, a method for distinguishing signal from noise may be to use jackknife pseudovalues to form signal and noise estimates, and then use an optimization method to maximize a functional of signal and noise estimates. Exemplary optimization methods may include generalized indicator function analysis (GIFA), canonical variate analysis, support vector machines, or any other supervised or unsupervised machine learning approach designed to distinguish between distributions.

For example, a generalized indicator function analysis (GIFA) approach is described herein. First, the jackknife mean estimate may be defined by $\tilde{\Gamma}^J = 1/M \Sigma_{i=1}^M \tilde{\Gamma}^i$, where $\tilde{\Gamma}^i = M\hat{\Gamma} - (M-1)\hat{\Gamma}^i$, for both mean and covariance estimates $\hat{\Gamma} = \hat{\Gamma}_{\mu,\Sigma}$. Define $\tilde{\Gamma}^\circ = 1/M(M-1) \Sigma_{i=1}^M |\tilde{\Gamma}^i - \tilde{\Gamma}^J|^2$. Using the GIFA approach, the criterion functional may be constructed:

$$K(\tau_c) = \psi^T (|\tilde{\Gamma}^J| - t_\alpha^2 |\tilde{\Gamma}^\circ|^{1/2}) \psi, \quad (21)$$

where $t_\alpha$ is a user-defined parameter and $\|$ denotes the absolute value (element by element). Minimization of $K(\tau_c)$ leads to the following eigenvalue problem:

$$(|\tilde{\Gamma}^J| - t_\alpha^2 |\tilde{\Gamma}^\circ|^{1/2}) \psi = \lambda \psi, \quad (22)$$

where the matrix, $|\tilde{\Gamma}^J| - t_\alpha^2 |\tilde{\Gamma}^\circ|^{1/2}$, on the left-hand side is a symmetric, real matrix with real eigenvalues and orthogonal eigenvectors. For this criterion function, with the null hypothesis, $H_0$, that $|\tilde{\Gamma}^J|$ and $|\tilde{\Gamma}^\circ|$ are Wishart distributed and estimated from the same distribution, $$Pr\{K(\tau_c) > 0 | H_0\} = Pr\{T^2 > \tau_\alpha^2 | H_0\}, \quad (23)$$

where Hotelling's $T^2$-statistic, $(\mu/\nu)T^2 = |\tilde{\Gamma}^J| / |\tilde{\Gamma}^\circ|^{1/2}$, is distributed as $F_{\nu,\mu}$, with $\nu = 2PT$ and $\mu = 2PT(M-1)$ degrees of freedom. Therefore, with $t_\alpha^2 = (\nu/\mu) F_{cdf}^{-1}(1-\alpha, \nu, \mu)$, eigenvectors with $\lambda > 0$ statistically significant at the $100(1-\alpha)\%$ level.

With this approach the new sets of eigenvectors (for both $\mu$ and $\Sigma$) from Equation 22 may replace the previous eigenvectors in the decomposition (see Equation 12).

A sieve approach may be used to decomposing the data matrix, in the framework outlined above for determining the statistically significant eigenvalues and associated eigenvectors of $\hat{\Gamma}_{\mu,\Sigma}$, an additional aspect may be addressed. For example, because the definition of $\hat{S}_\Sigma$ depends on $\hat{\mu}$, the statistically significant eigenvectors of $\hat{\Gamma}_\mu$ may be determined before attempting to determine those of $\hat{\Gamma}_\Sigma$. Therefore, the following may be redefined:

$$\hat{S}_\Sigma^i = \frac{1}{M-1} \sum_{(i)} (J_m(f) - \Pi\hat{\mu}(f) H_m)(J_m(f) - \Pi\hat{\mu}(f) H_m)^\dagger, \quad (24)$$

where $\Pi = \Psi \Psi^T$ is a projector that projects $\hat{\mu}$ onto the subspace of statistically significant eigenvectors of $\hat{\Gamma}_\mu$ and $\Psi = [\psi_{stat.sig.1} \psi_{stat.sig.2}, \ldots]$ is a matrix with columns the statistically significant eigenvectors of $\Gamma_\mu$. This, the mean may be estimated first, and then the covariance.

Once eigenvectors of both $\Gamma_\mu$ and $\Gamma_\Sigma$ have been determined, the residual information in the dataset may be analyzed. For example, the signal in the dataset may be removed by subtracting the dataset's projection onto the statistically significant eigenvectors from the dataset as follows:

$$Q_m(f) = (I - \Psi \Psi_q^T) J_m^q(f), \quad (25)$$

where $\Psi$ is a matrix of the combined statistically significant eigenvectors of either (or both) $\hat{\Gamma}_\mu$ and $\hat{\Gamma}_\Sigma$. If a combined set of eigenvectors is used, a Gramm-Schmidt procedure may be used to orthogonalize the set.

Finally, an estimate of the residual $S_R$ may be defined as follows:

$$\hat{S}_R = \sum_{f=-f_N}^{f_N} \sum_{m=1}^{M} Q_m(f)Q_m(f)^\dagger, \quad (26)$$

and its eigenvectors and their projections on X(t) may be analyzed for structure. Because the decompositions may be designed to optimize causal information, the eigenvectors of $\hat{S}_R$ may not include much useful information. The eigenvectors of the squared residuals as shown in Equation 27, however, may provide information concerning structure in higher moments.

$$\hat{S}_{R2} = \sum_{f=-f_N}^{f_N} \sum_{m=1}^{M} |Q_m(f)|^2 |Q_m(f)|^{2\dagger}. \quad (27)$$

The function $\sin(2\pi f \tau_c)/\pi f$ in Equation 11 may be defined as a causal filter. For $\tau_c \to 0$, this function may approach a constant on the interval $(-f_N, f_N)$ and for $\tau_c \to \infty$, it may approach a delta function. Over a finite time interval, allowing $\tau_c \to 0$ may introduce a sharp cutoff in $S_{\mu,\Sigma}(f)$ at $f_N$, which, in turn, may introduces a causal bias in the time domain. Therefore, a Slepian defined in the frequency domain, $h(f)$, may be introduced to eliminate this a causal bias. Multiple Slepians may not be used since multiple Slepians have already been used in the time domain for statistical averages. Thus, $h(f)$ may be set as $h_0(f)$, where $h_0(f)$ is a Slepian concentrated within a time interval $\Delta t$ (note that $\Delta t$ may be larger than the length of time between measurements).

Other filters may also be used to replace the sin function. For example, if a known harmonic sequence is in the data, a set of delta functions at multiples of the base harmonic frequency could be used. Further, band, low, or high pass filters may also be used depending on knowledge of the frequency support of the signal in the data.

Modifications may also be made in the definition of $\Gamma$. For example, the example herein used a symmetric definition integrating over all lags between $-\tau_c$ and $\tau_c$, which may be generalized to:

$$\Gamma = \int_{-\infty}^{\infty} d\tau C(\tau) g(\tau), \quad (28)$$

where $g(\tau)$ is an arbitrary function or distribution that vanishes at $\pm\infty$ and selects or weights particular lags more than others. Further, one might wish to eliminate the zero-lag contribution to the decomposition with the following definition (for discrete data):

$$\Gamma = \sum_{\tau=-\tau_c, \tau \neq 0}^{\tau_c} C(\tau). \quad (29)$$

A SVD may be performed on either the data matrix $X(t) \equiv X$ or its transpose $X^T$. A fast method of obtaining the left $\{\phi_n\}$ and right eigenvectors $\{a_n(t)\}$ may include first diagonalizing the smaller of the covariance matrices, $XX^T$ or $X^TX$, to find the left or right (respectively) eigenvectors of the SVD, and then the right or left (respectively) eigenvectors may be at their normalized projections. This exemplary method may be referred to as a "snapshot" method and may be useful for datasets including more pixels than measurements such as e.g., in neural imaging data.

For example, a data matrix from an experiment imaging including a 128×128 pixel frame once per second for an hour has dimensions of 16384×3600. The causal decomposition introduced herein may not admit the same symmetry as the SVD that allows one to calculate eigenvectors from either of the covariance matrices. The causal decomposition may, however, be recast in a similar form allowing for the "snapshot" method. When discretized and cast in matrix form, $$\Gamma(\tau_c) = X\left(\sum_{\tau=-\tau_c}^{\tau_c} S(\tau)\right) X^T, \quad (30)$$

where $S(\tau)$ is a shift matrix that, when used to multiply a vector, rotates the elements of the vector by the lag, $\tau$. The causal eigenvalue problem may be given by the following:

$$\Gamma \Psi = \Psi \Delta, \quad (31)$$

where $\Psi$ is an orthogonal matrix of eigenvectors and $\Delta$ a diagonal matrix of eigenvalues. Define $B \equiv (\Sigma_{\tau=-\tau_c}^{\tau_c} S(\tau))^{1/2} X^T \Psi$, $\Sigma_{\tau=-\tau_c}^{\tau_c} S(\tau)$ is symmetric and therefore admits a square root. Then, $$B^T B = \Psi^T X \left(\sum_{\tau=-\tau_c}^{\tau_c} S(\tau)\right) X^T \Psi \quad (32)$$

$$= \Delta. \quad (33)$$

Thus, defining $V \equiv B\Delta^{-1/2}$, $\Psi \Delta^{1/2} V^T$ is a singular value decomposition of $Y \equiv X(\Sigma_{\tau=-\tau_c}^{\tau_c} S(\tau))^{1/2}$ and the standard SVD may be used on Y to more efficiently obtain $\Psi$, $\Delta$, etc. The square root factor may be calculated by noting that the unitary Vandermonde matrix of the discrete Fourier transform, F, with elements $$[F]_{ab} \equiv \frac{1}{\sqrt{n}} e^{2\pi i ab/n}, \quad (34)$$

diagonalizes $S(\tau) = F\Xi(\tau)F^\dagger$, with $[\Xi]_{ab} = e^{2\pi i a/n}\delta_{ab}$. The following $$\left(\sum_{\tau=-\tau_c}^{\tau_c} S(\tau)\right)^{1/2} = F\left(\sum_{\tau=-\tau_c}^{\tau_c} \Xi^\tau\right)^{1/2} F^\dagger \quad (35)$$

is symmetric with real eigenvalues and may be calculated using Fast Fourier Transforms. Further, in the same way that it may be useful to examine the right eigenvectors, $\{a_n(t)\}$, of the standard SVD for temporal correlations, the right eigenvectors, $\{v_n(t)\}$ (the columns of V defined herein), of Y may be investigated for causal correlations.

Figure 4:
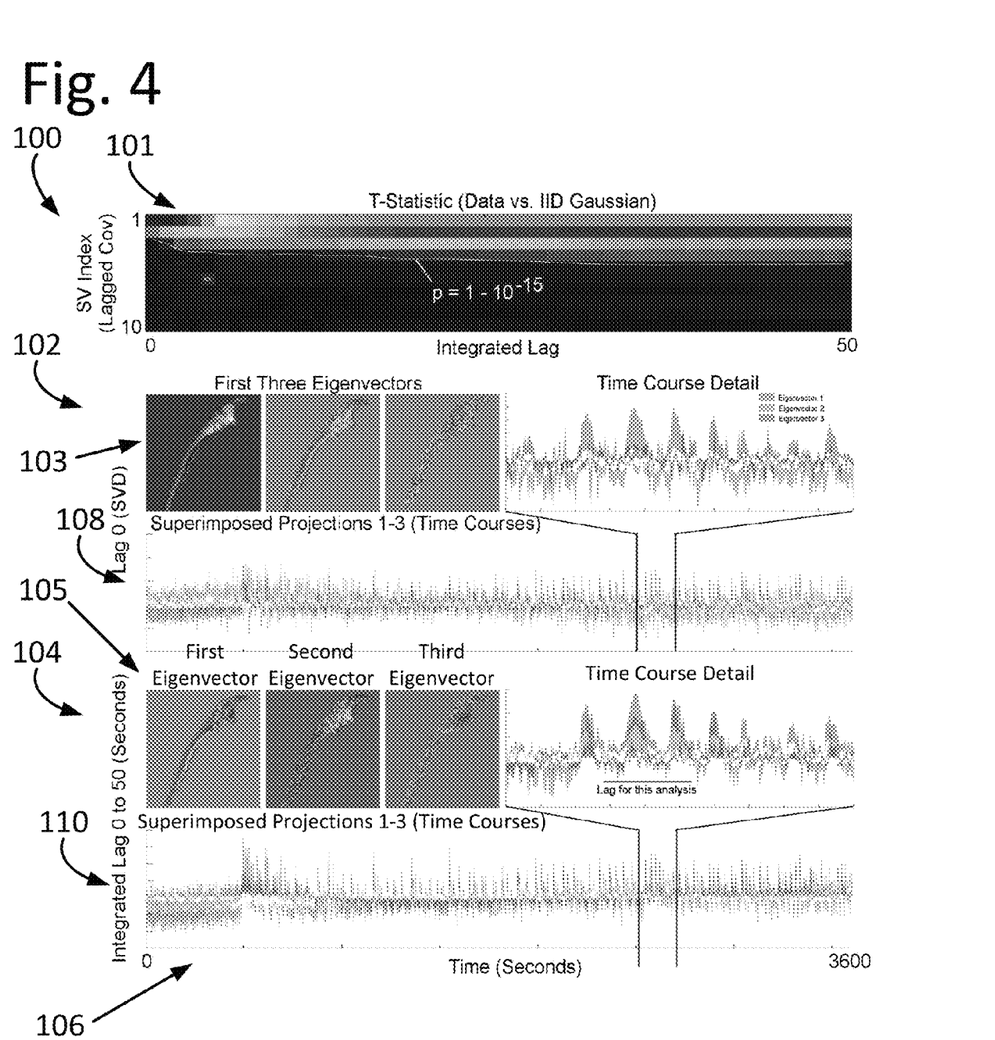
FIG. 4 shows experimental results comparing a causal decomposition with a singular value decomposition of calcium imaging data of a larval zebrafish.

Experimental results 100 comparing a causal decomposition 104 with an SVD 102 of calcium imaging data 101 of a larval zebrafish are presented in FIG. 4. In this example, the zebrafish was transgenic for the genetically encoded, ratiometric calcium indicator cameleon. Cameleon was expressed in all neurons in the central nervous system. Seizures were induced with the chemoconvulsant pentylenetetrazole (PTZ).

The SVD 102 was equivalent to a causal decomposition with $\tau=0$. The causal decomposition 104 was performed with $\tau=50$ seconds. Twice the number of statistically significant eigenvectors were found with the causal decomposition 104 relative to the SVD 102 (e.g., the number of eigenvectors doubled from 2 to 4). The eigenvectors (or images) 103 from the SVD 102 showed mixed regions of response from the spinal cord, hind-brain, tectum, and fore-brain. The 1st eigenvector, or image, 105 in the causal decomposition 104 was dominated by the spinal cord and its projections to the hind- and mid-brain, which represented the largest contribution to the covariance. The 2nd through 4th left eigenvectors 105 of the casual decomposition 104 (although only the 2nd and the 3rd eigenvector 105 are shown) showed three wave-like modes that encompassed most of the tectum (e.g., the dark patches between the middle and upper right of the depictions).

The time courses 108 corresponding to the first three eigenvectors 103 of the SVD 102 did not show any obvious correspondence in the SVD analysis 102. The time courses 110 corresponding to the first three eigenvectors 105 of the casual decomposition 104 did, however, show coherent, propagating waves in the tectum in the causal decomposition analysis as shown in the fourth row 106. The lag 50 time courses 110 are more sharply peaked during seizure activity compared to the lag 0 results 108. Further, wave-like lags are clearly visible between the time courses in the lag 50 time courses 110. Waves were initiated in the spinal cord (e.g., by the first eigenvector), then propagated across the tectum as a wave (e.g., the second-fifth eigenvectors). The wave propagation shown in lag 50 time courses 110 in the causal decomposition 104 was missed by the 0 lag analysis (SVD) 102 because, for example, the 0 lag analysis 102 is not designed to detect covarying structure other than at 0 lag.

With the causal decomposition described herein, some of the properties of the SVD may be lost. In particular, although the eigenvectors $\Psi_n$ are orthogonal, due to the symmetry of the $\Gamma$'s, the projections $\psi_n^T X(t)$ are real but may not be necessarily orthogonal, whereas they are for the SVD. As noted, however, the normalized projections, $\{v_n(t)\}$, of $\Psi_n$ on Y from the equivalent SVD are orthogonal, which may be investigated for causal information in the data set.

Calculating the $\Gamma$'s in the Fourier domain may reduce computational time significantly, as it does for any convolution. For singular data sets (P>T), the equivalent snapshot SVD on $Y=X(\Sigma_{\tau=-\tau_c}^{\tau_c} S(\tau))^{1/2}$ can further significantly reduce computation time.

The causal decomposition is a compromise between the SVD, which only diagonalizes the instantaneous covariance matrix and diagonalizing all covariance matrices at all lags (or, similarly, at all frequencies). As shown in the example in FIG. 4, the exemplary methods described herein are capable of extracting more information that is latent in the dataset than the SVD.

This disclosure has been provided with reference to illustrative embodiments and is not meant to be construed in a limiting sense. One skilled in the art will recognize that other various illustrative applications may use the techniques as described herein to take advantage of the beneficial characteristics of the apparatus and methods described herein. Various modifications of the illustrative embodiments, as well as additional embodiments of the disclosure, will be apparent upon reference to this description.

What is claimed is:

1. A computer-implemented method for use in analysis of data comprising:
   providing a dataset representative of data obtained over time;
   generating a plurality of eigenvalues and a plurality of eigenvectors of at least one lagged covariance matrix for the dataset in the time domain; and
   reconstructing an enhanced dataset using the plurality of eigenvalues and eigenvectors and the dataset.

2. The method of claim 1, wherein the at least one lagged covariance matrix for the dataset comprises a plurality of lagged covariance matrices for the dataset.

3. The method of claim 1, wherein generating the plurality of eigenvalues and the plurality of eigenvectors of at least one lagged covariance matrix for the dataset in the time domain comprises:
   generating at least one shift matrix for the dataset in the time domain; and
   generating the plurality of eigenvalues and the plurality of eigenvectors based on the at least one shift matrix.

4. The method of claim 3, wherein generating the plurality of eigenvalues and the plurality of eigenvectors based on the at least one shift matrix comprises generating the plurality of eigenvalues and the plurality of eigenvectors based on the at least one shift matrix using fast Fourier transforms.

5. The method of claim 1, wherein generating the plurality of eigenvalues and the plurality of eigenvectors of at least one lagged covariance matrix for the dataset in the time domain comprises:
   generating at least one lagged covariance matrix for the dataset in the time domain; and
   generating the plurality of eigenvalues and the plurality of eigenvectors based on the at least one lagged covariance matrix.

6. The method of claim 5, wherein generating the plurality of eigenvalues and the plurality of eigenvectors of at least one lagged covariance matrix for the dataset in the time domain further comprises:
   generating a zero-lagged covariance matrix for the dataset in the time domain; and
   generating the plurality of eigenvalues and the plurality of eigenvectors based on the at least one lagged covariance matrix and the zero-lagged covariance matrix.

7. The method of claim 5, wherein generating the at least one lagged covariance matrix for the dataset in the time domain comprises:
   generating a mean estimate dataset for use in generating the at least one lagged covariance matrix;
   removing the mean estimate dataset from the dataset to generate a residual dataset; and
   generating the at least one lagged covariance matrix for the residual dataset.

8. The method of claim 1, wherein the method further comprises: testing the plurality of eigenvalues and the plurality of eigenvectors for significance; and selecting a set of the plurality of eigenvalues and the plurality of eigenvectors based on the tested significance for use in reconstructing the enhanced dataset.

9. The method of claim 8, wherein testing the plurality of eigenvalues and the plurality of eigenvectors for significance comprises using bootstrap estimates to determine the significance of the plurality of eigenvalues and the plurality of eigenvectors, wherein the bootstrap estimates are generated using multitaper techniques.

10. The method of claim 8, wherein testing the plurality of eigenvalues and the plurality of eigenvectors for significance comprises using at least one of machine learning techniques, canonical variate analysis, support vector machines, and generalized indicator function analysis.

11. The method of claim 1, wherein reconstructing an enhanced dataset comprises:
   generating a set of transformation vectors using the plurality of eigenvalues and eigenvectors;

generating a set of orthogonal basis transformation vectors based on the set of transformation vectors defining a subspace;

projecting the dataset onto the subspace defined by the set of orthogonal basis vectors resulting in projected data; and using the projected data to generate the enhanced dataset.

12. The method of claim 1, wherein the data obtained over time is a plurality of frames of image data obtained over time.

13. The method of claim 1, wherein the method further includes outputting the enhanced dataset to at least one of a user, a display, and a file.

14. A non-transitory computer readable storage medium storing a computer program for use in conjunction with a processing apparatus to analyze data, and is operable when used with the processing apparatus to:

recognize a dataset representative of data obtained over time;

generate a plurality of eigenvalues and a plurality of eigenvectors of at least one lagged covariance matrix for the dataset in the time domain; and reconstruct an enhanced dataset using the plurality of eigenvalues and eigenvectors and the dataset.

15. The non-transitory computer readable storage medium of claim 14, wherein the at least one lagged covariance matrix for the dataset comprises a plurality of lagged covariance matrices for the dataset.

16. The non-transitory computer readable storage medium of claim 14, wherein, to generate the plurality of eigenvalues and the plurality of eigenvectors of at least one lagged covariance matrix for the dataset in the time domain, the computer program is further operable to: generating at least one shift matrix for the dataset in the time domain; and generating the plurality of eigenvalues and the plurality of eigenvectors based on the at least one shift matrix.

17. The non-transitory computer readable storage medium of claim 16, wherein, to generate the plurality of eigenvalues and the plurality of eigenvectors based on the at least one shift matrix, the computer program is further operable to generate the plurality of eigenvalues and the plurality of eigenvectors based on the at least one shift matrix using fast Fourier transforms.

18. The non-transitory computer readable storage medium of claim 14, wherein, to generate the plurality of eigenvalues and the plurality of eigenvectors of at least one lagged covariance matrix for the dataset in the time domain, the computer program is further operable to:

generate at least one lagged covariance matrix for the dataset in the time domain; and generate the plurality of eigenvalues and the plurality of eigenvectors based on the at least one lagged covariance matrix.

19. The non-transitory computer readable storage medium of claim 18, wherein, to generate the plurality of eigenvalues and the plurality of eigenvectors of at least one lagged covariance matrix for the dataset in the time domain, the computer program is further operable to:

generate a zero-lagged covariance matrix for the dataset in the time domain; and generate the plurality of eigenvalues and the plurality of eigenvectors based on the at least one lagged covariance matrix and the zero-lagged covariance matrix.

20. The non-transitory computer readable storage medium of claim 18, wherein, to generate the at least one lagged covariance matrix for the dataset in the time domain, the computer program is further operable to:

generate a mean estimate dataset for use in generating the at least one lagged covariance matrix;

remove the mean estimate dataset from the dataset to generate a residual dataset; and generate the at least one lagged covariance matrix for the residual dataset.

21. The non-transitory computer readable storage medium of claim 14, wherein the computer program is further operable to:

test the plurality of eigenvalues and the plurality of eigenvectors for significance; and select a set of the plurality of eigenvalues and the plurality of eigenvectors based on the tested significance for use in reconstructing the enhanced dataset.

22. The non-transitory computer readable storage medium of claim 21, wherein, to test the plurality of eigenvalues and the plurality of eigenvectors for significance, the computer program is further operable test the plurality of eigenvalues and the plurality of eigenvectors for significance using bootstrap estimates to determine the significance of the plurality of eigenvalues and the plurality of eigenvectors, wherein the bootstrap estimates are generated using multitaper techniques.

23. The non-transitory computer readable storage medium of claim 21, wherein, to test the plurality of eigenvalues and the plurality of eigenvectors for significance, the computer program is further operable test the plurality of eigenvalues and the plurality of eigenvectors for significance using at least one of machine learning techniques, canonical variate analysis, support vector machines, and generalized indicator function analysis.

24. The non-transitory computer readable storage medium of claim 14, wherein, to reconstruct an enhanced dataset, the computer program is further operable:

generate a set of transformation vectors using the plurality of eigenvalues and eigenvectors;

generate a set of orthogonal basis transformation vectors based on the set of transformation vectors defining a subspace;

project the dataset onto the subspace defined by the set of orthogonal basis vectors resulting in projected data; and use the projected data to generate the enhanced dataset.

25. The non-transitory computer readable storage medium of claim 14, wherein the data obtained over time is a plurality of frames of image data obtained over time.

26. The non-transitory computer readable storage medium of claim 14, wherein the computer program is further operable to output the enhanced dataset to at least one of a user, a display, and a file.

27. A computer-implemented method for use in analysis of data comprising:

providing a dataset representative of data obtained over time;

generating a plurality of eigenvalues and a plurality of eigenvectors of a plurality of lagged covariance matrices for the dataset; and reconstructing an enhanced dataset using the plurality of eigenvalues and eigenvectors and the dataset.

28. The method of claim 27, wherein generating the plurality of eigenvalues and the plurality of eigenvectors of a plurality of lagged covariance matrices for the dataset comprises: generating a plurality of shift matrices for the dataset; and generating the plurality of eigenvalues and the plurality of eigenvectors based on the plurality of shift matrices.

29. The method of claim 28, wherein generating the plurality of eigenvalues and the plurality of eigenvectors based on the plurality of shift matrices comprises generating the plurality of eigenvalues and the plurality of eigenvectors based on the plurality of shift matrices using fast Fourier transforms.

30. The method of claim 27, wherein generating the plurality of eigenvalues and the plurality of eigenvectors of a plurality of lagged covariance matrices for the dataset comprises:
generating a plurality of lagged covariance matrices for the dataset; and
generating the plurality of eigenvalues and the plurality of eigenvectors based on the plurality of lagged covariance matrices.

31. The method of claim 30, wherein generating the plurality of eigenvalues and the plurality of eigenvectors of a plurality of lagged covariance matrices for the dataset further comprises: generating a zero-lagged covariance matrix for the dataset; and
generating the plurality of eigenvalues and the plurality of eigenvectors based on the plurality of lagged covariance matrices and the zero-lagged covariance matrix.

32. The method of claim 30, wherein generating the plurality of eigenvalues and the plurality of eigenvectors based on the plurality of lagged covariance matrices comprises:
summing the plurality of lagged covariance matrices to generate a summed covariance matrix; and
generating the plurality of eigenvalues and the plurality of eigenvectors based on the summed covariance matrix.

33. The method of claim 27, wherein the method further comprises:
testing the plurality of eigenvalues and the plurality of eigenvectors for significance; and
selecting a set of the plurality of eigenvalues and the plurality of eigenvectors based on the tested significance for use in reconstructing the enhanced dataset.

34. The method of claim 33, wherein testing the plurality of eigenvalues and the plurality of eigenvectors for significance comprises using bootstrap estimates to determine the significance of the plurality of eigenvalues and the plurality of eigenvectors, wherein the bootstrap estimates are generated using multitaper techniques.

35. A non-transitory computer readable storage medium storing a computer program for use in conjunction with a processing apparatus to analyze data, and is operable when used with the processing apparatus to:
recognize a dataset representative of data obtained over time;
generate a plurality of eigenvalues and a plurality of eigenvectors of a plurality of lagged covariance matrices for the dataset; and
reconstruct an enhanced dataset using the plurality of eigenvalues and eigenvectors and the dataset.

36. The non-transitory computer readable storage medium of claim 35, wherein, to generate the plurality of eigenvalues and the plurality of eigenvectors of a plurality of lagged covariance matrices for the dataset, the computer program is operable to:
generate a plurality of shift matrices for the dataset; and
generate the plurality of eigenvalues and the plurality of eigenvectors based on the plurality of shift matrices.

37. The non-transitory computer readable storage medium of claim 36, wherein, to generate the plurality of eigenvalues and the plurality of eigenvectors based on the plurality of shift matrices, the computer program is further operable to generate the plurality of eigenvalues and the plurality of eigenvectors based on the plurality of shift matrices using fast Fourier transforms.

38. The non-transitory computer readable storage medium of claim 35, wherein to generate the plurality of eigenvalues and the plurality of eigenvectors of a plurality of lagged covariance matrices for the dataset, the computer program is operable to:
generate a plurality of lagged covariance matrices for the dataset; and generate the plurality of eigenvalues and the plurality of eigenvectors based on the plurality of lagged covariance matrices.

39. The non-transitory computer readable storage medium of claim 38, wherein to generate the plurality of eigenvalues and the plurality of eigenvectors of a plurality of lagged covariance matrices for the dataset, the computer program is further operable to:
generate a zero-lagged covariance matrix for the dataset; and
generate the plurality of eigenvalues and the plurality of eigenvectors based on the plurality of lagged covariance matrices and the zero-lagged covariance matrix.

40. The non-transitory computer readable storage medium of claim 38, wherein to generate the plurality of eigenvalues and the plurality of eigenvectors based on the plurality of lagged covariance matrices, the computer program is further operable to:
sum the plurality of lagged covariance matrices to generate a summed covariance matrix; and
generate the plurality of eigenvalues and the plurality of eigenvectors based on the summed covariance matrix.

41. The non-transitory computer readable storage medium of claim 35, wherein the computer program is further operable to:
test the plurality of eigenvalues and the plurality of eigenvectors for significance; and
select a set of the plurality of eigenvalues and the plurality of eigenvectors based on the tested significance for use in reconstructing the enhanced dataset.

42. The non-transitory computer readable storage medium of claim 41, wherein, to test the plurality of eigenvalues and the plurality of eigenvectors for significance, the computer program is further operable to use bootstrap estimates to determine the significance of the plurality of eigenvalues and the plurality of eigenvectors, wherein the bootstrap estimates are generated using multitaper techniques.

\* \* \* \* \*